June 30, 1925.
F. KARR
SPRING
Original Filed March 24, 1921
1,544,237
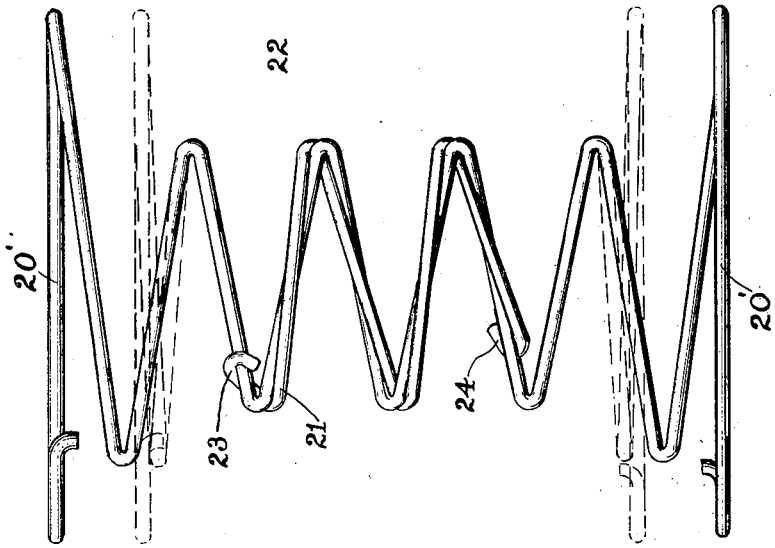
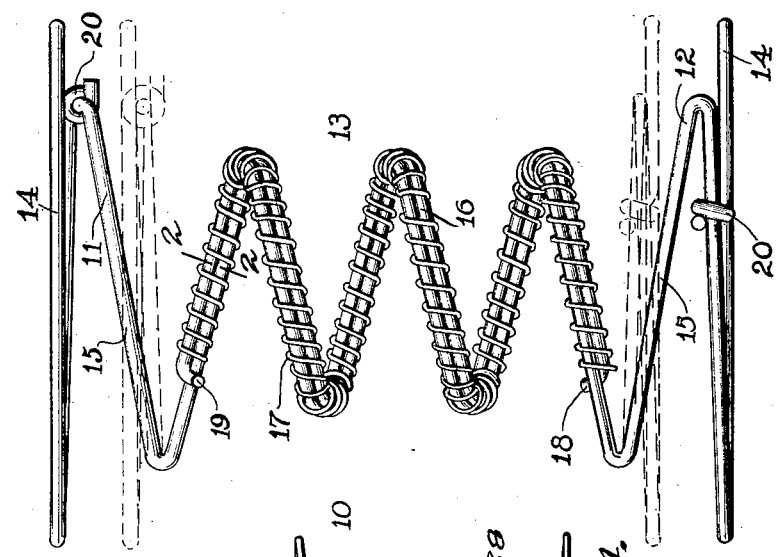
Inventor:
Francis Karr
By Gillson & Gillson
Attorneys.

Patented June 30, 1925.

1,544,237

UNITED STATES PATENT OFFICE.

FRANCIS KARR, OF HOLLAND, MICHIGAN.

SPRING.

Application filed March 24, 1921, Serial No. 455,216. Renewed December 12, 1923.

*To all whom it may concern:*

Be it known that I, FRANCIS KARR, a citizen of the United States, and resident of Holland, county of Ottawa, and State of Michigan, have invented certain new and useful Improvements in Springs, of which the following is a specification, and which are illustrated in the accompanying drawings, forming a part thereof.

The invention relates to coil springs for any purpose where a relatively light resistance to initial compression, coupled with a substantially greater resistance to maximum compression, is desired. While coil springs have been constructed to afford different resistances to flexure in the terminal and intermediate turns thereof by making the spring of varying diameter throughout its length, the result so obtained has not been sufficiently marked for some purposes. For example, in the coil springs of cushions, bed bottoms and the like, the so-called luxury of a light spring with sufficient resistance to final compression to prevent complete closing of the spring by the greatest pressure which may be applied thereto in service, is highly desirable but has been impossible of attainment with the forms of construction heretofore in use.

The object of the invention is accordingly to provide a coil spring affording a greatly increased difference in the amount of resistance afforded to initial and maximum compression. To this end the invention contemplates a coil spring unit comprising a plurality of spring elements, the turns of which are intercoiled in a part only of the complete unit. In the preferred embodiment of the invention a feature thereof provides for the angular adjustment of the terminal coils of the spring unit to obtain a desired relative location of corresponding parts of the said terminal coils about the spring axis.

The invention is illustrated in the accompanying drawings, wherein,

Fig. 1 is a side elevation of the improved spring with the position of the terminal coils in a partially compressed condition of the spring indicated by dotted lines;

Fig. 2 is a detail sectional view taken on the line 2—2 of Fig. 1; Fig. 3 is a view similar to Fig. 1, showing a modified form of construction and a different means of uniting the elements of which the improved spring is composed; and Fig. 4 is a side elevation of a still further modified form of the spring, shown on a smaller scale.

The spring unit generally designated 10 (Fig. 1) may comprise two spring elements 11 and 12, some of the turns of which are intercoiled, as in the intermediate portion 13 of the spring unit. When so constructed the two spring elements 11, 12, may be identical in form. As shown, each of the said spring elements includes a closed ring 14 at one end, an adjacent turn 15 of intermediate size and a plurality of smaller turns 16.

In assembling a spring unit of the form shown in Figs. 1 and 2, the smaller turns 16 of the two spring elements 11, 12, are intercoiled. For this purpose, a tube 17 of proper diameter to enclose the overlapped portions of the two spring elements is threaded upon the smaller turns 16 of one of the said spring elements. The smaller turns 16 of the other spring element are then entered in the tube by a relative rotative movement of the two spring elements. Preferably the tube 17 takes the form of an extended helix of spring wire of small diameter in comparison with the size of the material of which the spring elements 11 and 12 are formed.

There being no relative turning of the two spring elements 11, 12, in the ordinary use of the spring unit 10, the relative arrangement of the parts is permanent when they are assembled as shown and described. If desired, however, the inner end portions of the two spring elements may be turned inwardly both with reference to the axis and the ends of the spring unit, as at 18 and 19, to provide stops at the opposite ends of the tubular enclosure 17. The said inturning of the end portions 18, 19, of the spring elements 11 and 12 is also desirable to avoid projection of the ends of the spring elements beyond the planes of the corresponding terminal coils 14 during compression of the spring. Since the parts of the spring are assembled by relative rotative movement of the two spring elements 11, 12, any desired relative angular position of corresponding parts of the two spring elements, as the knots 20 in the terminal coils or rings 14 is readily obtained.

In the form of construction illustrated in Fig. 3, the two elements 20', 21, of the spring unit generally designated 22, are of different lengths. As shown, the spring element 20' extends throughout the full length of the spring unit 22 while the spring element 21 is intercoiled with the element 20' only in the intermediate turns thereof. Fig. 3 also illustrated a modification in respect to the manner in which the two spring elements are united, the two ends 23, 24, of the spring element 21 being merely wrapped about the wire of which the spring element 20' is composed. While the manner of uniting the two spring elements illustrated in Figs. 1 and 2 is shown only in connection with a spring unit comprising spring elements of like length, and the manner of uniting the spring elements illustrated in Fig. 3 is shown only in connection with a pring unit comprising spring elements of different lengths, it is obvious that the two spring elements of each of the said forms of spring units may be united in either way. For instance, in Fig. 4, the spring unit is composed of two spring elements, 25 and 26, having only their inner portions intercoiled as in Fig. 1, and having the inner end of each wrapped about a coil of the other as at 27 and 28, for fastening the elements together, in the manner disclosed in Fig. 3 of the drawing.

I claim as my invention:

1. A coil spring unit comprising, in combination, two coil spring elements having a part only of their turns intercoiled and the remaining turns extending beyond the intercoiled turns in opposite directions.

2. A coil spring unit comprising, in combination, two like coil spring elements each having turns of different sizes, the smaller turns of the two elements being intercoiled and constituting the intermediate portion of the spring unit and the larger turns of the two elements constituting the opposite end portions of the spring unit the said intercoiled turns being frictionally united to permit relative angular adjustment of the two spring elements.

3. A coil spring unit comprising, in combinaton, intermediate turns composed of a coiled double strand of spring wire and end turns each composed of a coiled single strand of wire extending in opposite directions from said double strand.

4. A coil spring unit comprising, in combination, intermediate and end turns of different size, the said intermediate turns being composed of a coiled double strand of spring wire and the end turns being each composed of wire extending outwardly from said intermediate turns.

5. A coil spring unit comprising, in combination, two coil spring elements having a part only of their turns intercoiled and the remaining turns extending beyond the intercoiled turns in opposite directions, the said intercoiled turns of the two spring elements being frictionally united to permit relative angular adjustment of the two spring elements.

6. A coiled spring unit comprising, in combination, two separate coil spring elements having inner portions intercoiled and each having its outer end extending outwardly beyond the intercoiled portion and having its inner end wrapped about an adjacent coil of the other element for holding said elements in assembled relation.

FRANCIS KARR.